Figure 8:
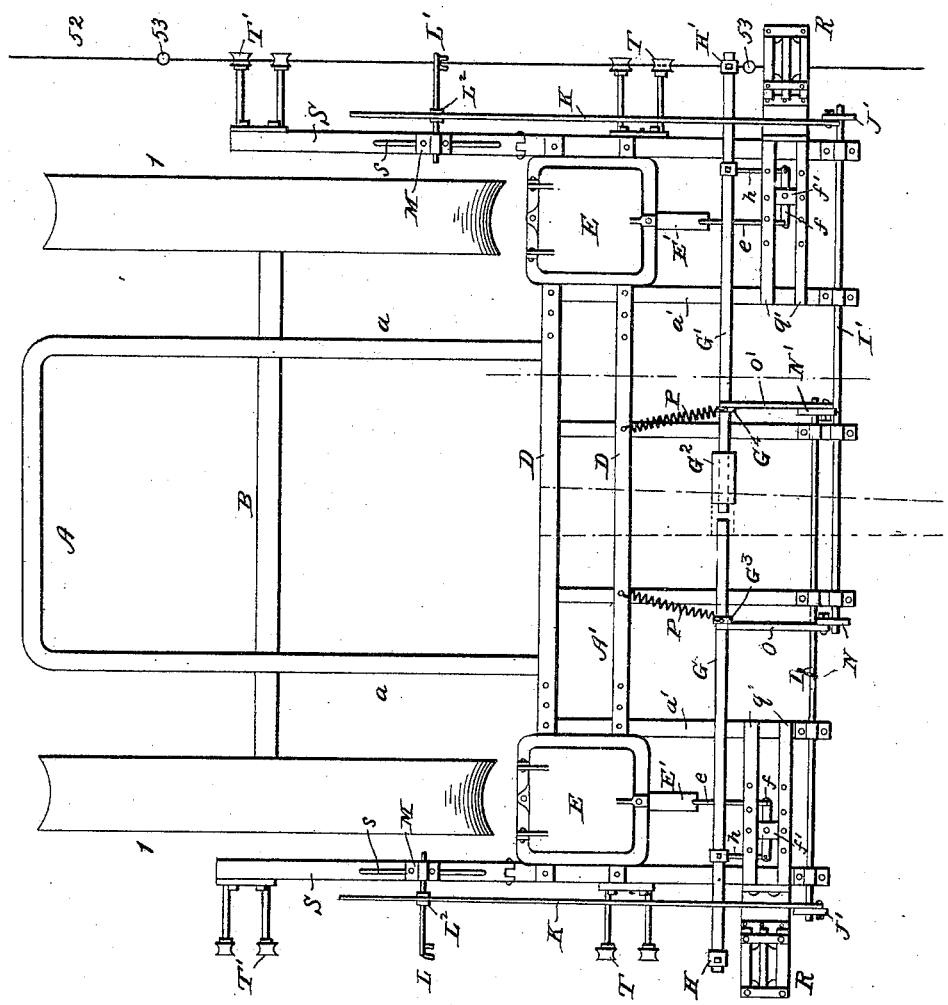

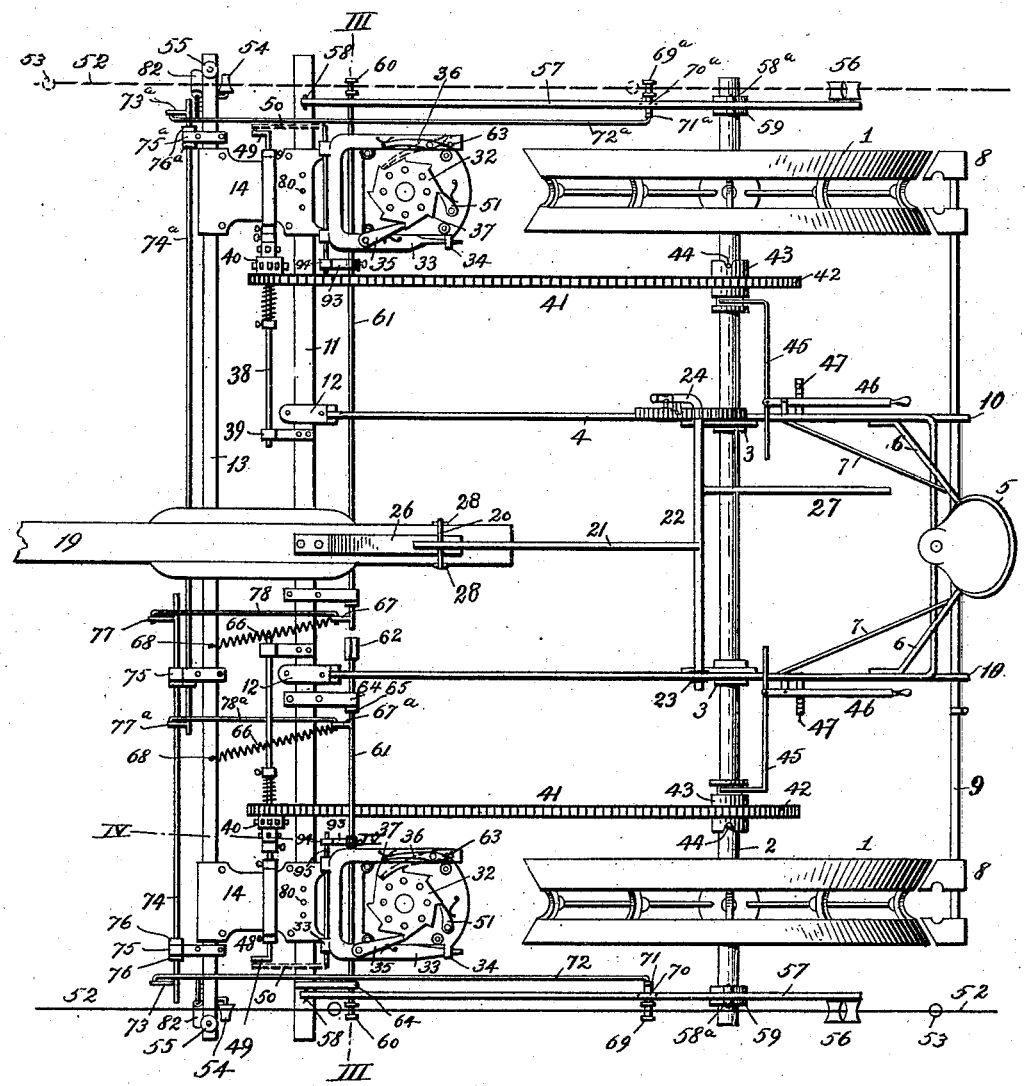

No. 688,940. Patented Dec. 17, 1901.
J. H. ELWARD.
PLANTER AND DRILL.
(Application filed Apr. 30, 1900.)
(No Model.) 5 Sheets—Sheet 2.
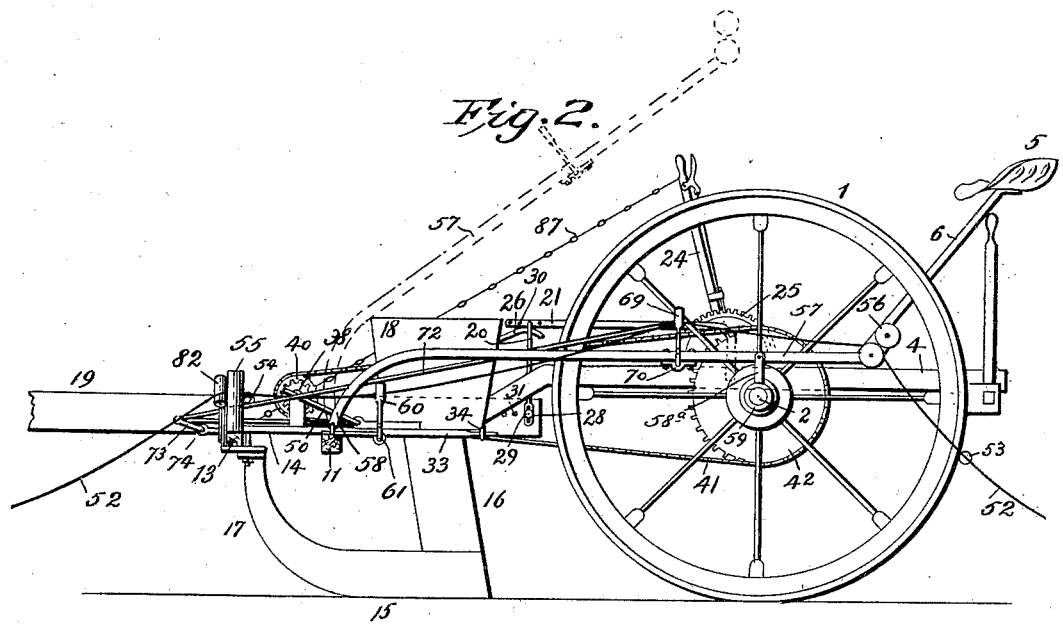
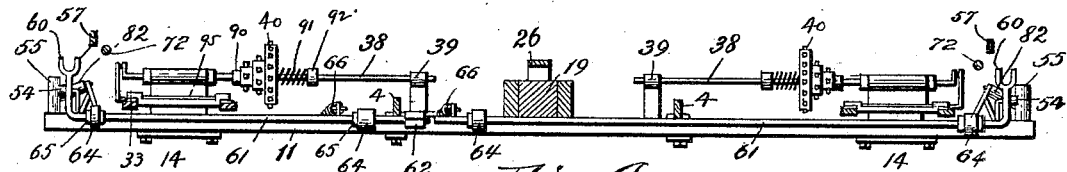
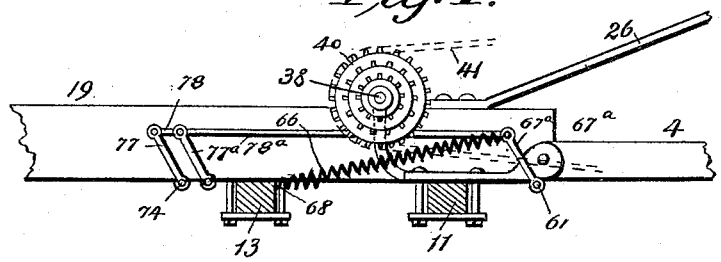
Witnesses:
E. C. Duffy
R. B. Cavanagh
Inventor
John H. Elward
by H. H. Bliss
Atty.

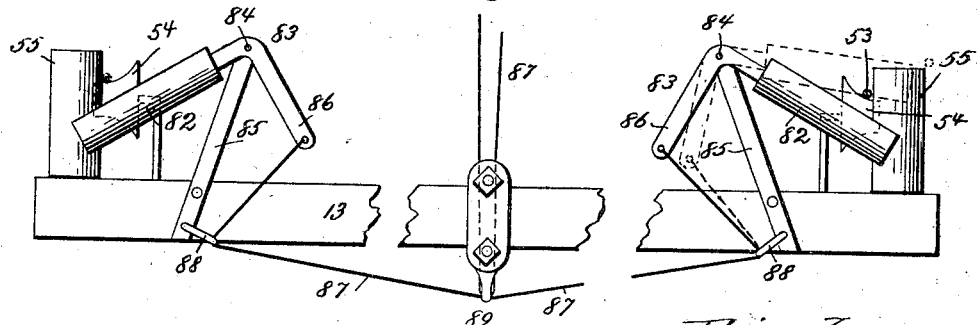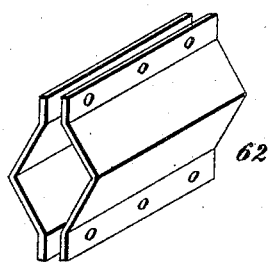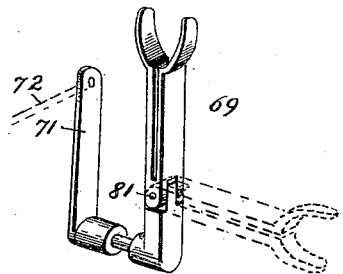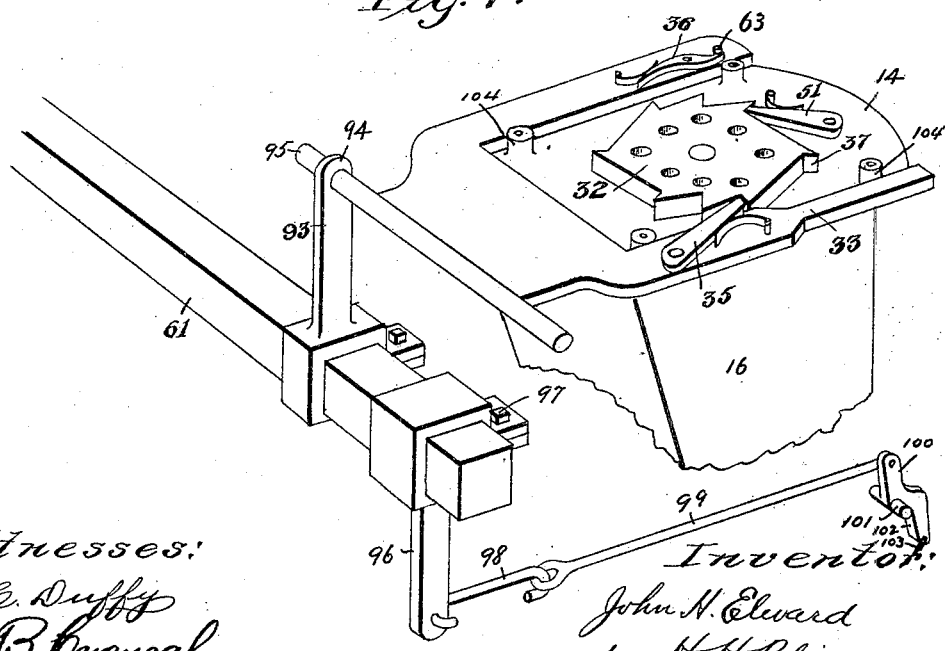

No. 688,940. Patented Dec. 17, 1901.
J. H. ELWARD.
PLANTER AND DRILL.
(Application filed Apr. 30, 1900.)
(No Model.) 5 Sheets—Sheet 4.

Witnesses:
Richard T. B. Cavanagh.
Albert K. Williams Jr.

Inventor:
John H. Elward.
By H. H. Bliss
Attorney

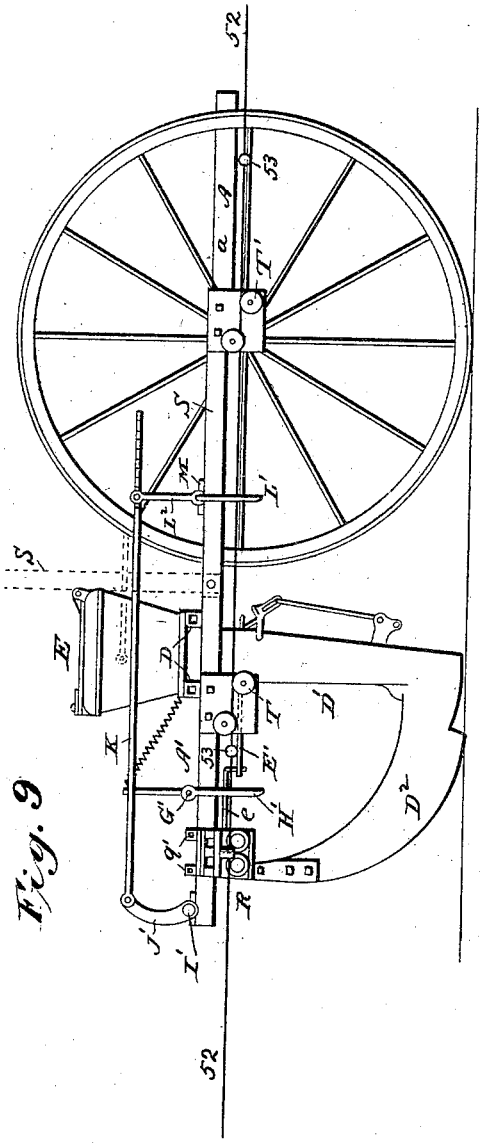
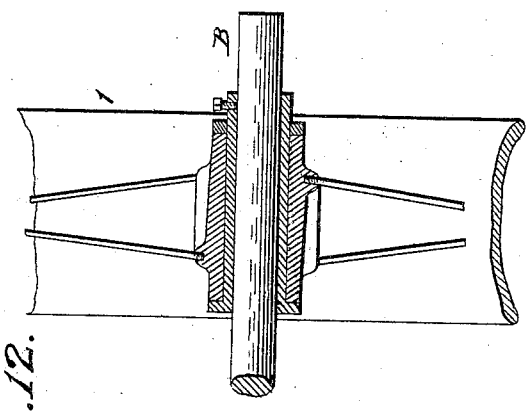

UNITED STATES PATENT OFFICE.

JOHN H. ELWARD, OF PRETTY PRAIRIE, KANSAS.

PLANTER AND DRILL.

SPECIFICATION forming part of Letters Patent No. 688,940, dated December 17, 1901.

Application filed April 30, 1900. Serial No. 14,988. (No model.)

*To all whom it may concern:*

Be it known that I, JOHN H. ELWARD, a citizen of the United States, residing at Pretty Prairie, in the county of Reno and State of Kansas, have invented certain new and useful Improvements in Planters and Drills, of which the following is a specification, reference being had therein to the accompanying drawings.

My invention relates to drilling and planting mechanisms, and comprises features of improvement which may be used in a drilling-machine and other features which may be employed in a check-row corn-planter, as well as improvements which are or may be comprised in a combined machine adapted for either drilling or planting.

My invention has for one of its objects to produce a machine which comprises mechanism whereby the planting devices on both sides of the machine may be actuated by the check-wire either simultaneously for the ordinary mode of planting or alternately for the zigzag or quincunx mode of planting.

In order to make the invention more clearly understood, I have shown in the accompanying drawings means for carrying the same into practical effect without limiting my improvements in their useful applications to the particular constructions which for the sake of illustration I have delineated.

In said drawings, Figure 1 is a plan view of a drill and check-row planter embodying my invention with the seedboxes removed. Fig. 2 is a side view of the same. Fig. 3 is a sectional view on line III III, Fig. 1. Fig. 4 is a transverse sectional view on line IV IV, Fig. 1. Fig. 5 is a front view of a portion of the machine, illustrating the means for guiding and throwing off the check-wire. Fig. 6 is a perspective view of the coupling-clamp for the main rock-shaft. Fig. 7 is a perspective view of one of the checking-forks. Fig. 7ª is a perspective view of the seeding mechanism. Fig. 8 is a plan view of a simplified form of machine which does not include the rotary drilling mechanism. Fig. 9 is a side view of the same. Figs. 10 and 11 are longitudinal sectional detail views illustrating the rock-shaft mechanisms. Fig. 12 is a sectional view of a portion of one of the ground-wheels.

Referring to the drawings, 1 indicates the ground-wheels, fixed on a supporting and driving axle or shaft 2. The latter carries by bearings 3 a wheel-frame 4, preferably horizontal and of the skeleton form shown.

5 is the driver's seat, carried at the rear of the axle by supports 6 and braces 7 from the frame 4.

8 indicates scrapers for removing the mud from the ground-wheels, carried by a rock-shaft 9, held in bearings 10 at the rear part of the frame and adapted to be turned by a lever or other suitable means to bring the scrapers against the wheels.

The frame 4 is attached by its downwardly-bent forward ends to the rear bar 11 of the main or runner frame by bearing-brackets 12, which allow a relative hinging of said frames to permit the raising of the runners out of the ground or gaging the depth of planting. The runner-frame also comprises a front bar 13, connected with the bar 11 by plates 14, carrying the seeding devices.

15 15 are the planter-runners or furrow-openers, attached by their tubular seed-conducting standards 16 and also by their forward ends 17 to the rear and front parts of the plates 14.

18 18 are the seedboxes, mounted on the plates 14 over the standards 16.

The runner-frame further comprises a draft-tongue 19, attached rigidly to the bars 13 11 and extending back between the side bars of the frame 4. The rear end of the tongue is connected by a link or links 20 with a lever-arm 21, fixed on a shaft 22. This shaft is mounted in bearings 23 on the frame 4 and has fixed to it a hand-lever 24, with which is combined the usual locking devices, comprising a dog on the lever and a segment 25, fixed on the frame 4. By operating this lever the wheel-frame and runner-frame may be caused to oscillate relative to each other at 12 to regulate the depth of the runners or raise them from the ground.

26 is a spring-arm fixed on the tongue and adapted to be engaged and depressed by the arm 21, whereby the runners may be forced into the ground by more or less of the weight of the wheel-frame 4 and of the driver.

27 is a foot-lever rigid with the shaft 22 and extending back toward the driver's seat, by depressing which lever the operator may assist the hand-lever 24 in lifting the runners.

The lower ends of the links 20 are formed with loops 28, through which passes the pin 29, which connects them with the tongue. These loops form a loose connection, permitting a proper vibration of the frame members in passing over rough ground. The arm 21 is formed with a series of perforations 30 and the tongue with a series of perforations 31, whereby by adjusting the links 20 forward or backward the leverage and movements of the parts may be regulated.

The seeding devices comprise rotary dropping-plates 32 in the bottoms of the boxes 18, adapted in a well-known manner to receive a step-by-step rotation and at each movement or step to open a passage into the standards 16 to permit the exit of seed from the boxes.

33 represents slides working forward and backward on the plates 14 or other suitable supports at or near the boxes and suitably guided, as by eyes 34.

35 36 are spring-actuated pawls mounted on the slide and engaging a ratchet 37, formed on or connected with the dropping-plates 32.

I provide independent mechanisms for operating the two sets of seeding devices, either rapidly and simultaneously, as in drilling, or at regular intervals and simultaneously or alternately, as in hilling or check-rowing. Referring first to the drilling mechanism, 38 38 are the drill-shafts, arranged transversely of the machine and preferably between the bars of the runner-frame, on which frame they are supported by suitable bearings 39 at their inner ends. At their outer ends they are held in bearings on the plates 14. Fixed on or connected with the drill-shaft is a sprocket-cone 40, having two or more toothed portions of different diameters.

41 is the driving-chain, which may be placed on the larger or smaller part of the cone 40, according to the speed of operation of the dropping-plate which is desired. The chain is driven by a sprocket-wheel 42, mounted loosely on the main axle 2 and having a clutch-hub 43, which may be moved into or out of engagement with a pin 44, fixed in the axle, by means of a shifting-fork 45 and hand-lever 46. The latter is locked when adjusted by a rack 47. The drill-shaft is held from end movement by set-collars 48 at the sides of the plate 14 and is connected by a crank 49 and pitman 50 with the slide 33 to reciprocate the same in drilling. In this operation the pawl 36 turns the dropping-plate at each forward movement of the slide and the pawl 35 at each backward movement, giving great rapidity of seeding. The plate is held from backward turning by a spring-actuated pawl 51.

I will now describe the hilling or check-rowing mechanisms comprised in the machine illustrated and which may be used in connection with the seeding devices, the drilling mechanisms above described being thrown out of operation.

In describing the check-row devices I will refer to those at one side of the machine, the two sets of mechanisms being of similar construction.

52 is the check-wire, provided with buttons or knots 53. It is received at the front of the machine over a roller 54, which is flanged at its inner end and at its outer end extends past a vertical roller 55, the wire passing inside of the roller 55 and between the same and the flange of the roller 54. These rollers are suitably mounted at the outer end of the bar 13 of the runner-frame. Thence the wire passes, through forks hereinafter described, between rear guiding rollers or spools 56, mounted at proper height on the rear end of a bar 57, hinged at 58 to the runner-frame. The rear end of this bar is supported by a fork 58ª, resting on the shaft 2 between set-collars 59 and pivoted to the bar. This pivoting permits any necessary longitudinal movement of the bar—as, for instance, when the wheel and runner frames rock relative to each other. The hinge 58 allows the bar to be thrown up, as shown in dotted lines, Fig. 2, for any necessary purpose, as for removing the wheels.

The main dropping or checking fork is shown at 60, in line between the front wire-guiding devices 54 55 and the rear guiding devices 56 and fixed on the end of the main rock-shaft 61, so as to turn said shaft backward when a button 53 engages said fork. By suitable connections the shaft 61 can be caused to operate the dropping-plate in the box 18, situated near the end of said shaft. When the ordinary mode of hilling is followed, the seeding devices at the opposite side of the machine are simultaneously operated. For this purpose the two parts of the shafts 61, which are arranged in line with each other and end to end, are coupled together by a removable sleeve or coupling 62, Fig. 6. This coupling or clamp is preferably made square in cross-section, adapted to fit correspondingly-squared ends of the shafts 61, and in two halves, flanged and bolted together. When said shafts are thus united, a hill will be planted from each seedbox at each operation of the fork 60 by a check-button. It will be understood that at such times both of the pitmen 50 are removed, the pawls 36 are thrown out of operation and locked out of engagement with the ratchets 37 by pins 63, fixed in the slides 33, and the wheels 42 are disengaged from the pins 44. The shaft 61 is mounted in bearing-brackets 64 on the runner-frame and held from longitudinal movement by set-collars 65. After the operation of the shaft 61 by the check-button the shaft and fork are returned to normal position by one or more springs 66, connecting arms 67 67ª on the shaft with a part of the runner-frame at 68.

For certain purposes it is recognized as desirable to plant the hills in an alternate zigzag or quincunx order, by which means the hills may be placed at the usual distance apart; but the rows of hills may be apart eighty-seven hundredths of the usual distance, thus getting the same number of hills no nearer together on a less area of ground than is required by the ordinary mode of planting. My invention comprises a new and improved means for obtaining this result, comprising supplemental checking devices, which will now be described.

69 is a supplemental check-fork mounted in line with the position of the check-wire on the bar 57 in a bearing 70. Connected with said fork is an arm 71, from which leads a reciprocating link 72 to an arm 73 on a supplemental rock-shaft 74. This shaft is mounted at a convenient point on the runner-frame—for instance, in front of the bar 13—in bearing-brackets 75, secured to said bar. The shaft is held in place longitudinally and is adjustable by set-collars 76 and has at its inner end an arm 77, connected by a link or rod 78 with the arm 67 on the main rock-shaft 61, belonging to the other side of the machine.

It will be seen that there are two sets of the supplemental checking devices above described, one set at each side of the machine, those for the off side of the machine being indicated by the figures 69$^a$ to 78$^a$.

The coupling 62 being removed and the shafts 61 left to move independently and the fork 69 being in operative position, a button of the check-wire will first operate the fork 60 and plant a hill from the near seedbox. When the machine has advanced one-half the distance between the buttons on the wire, (the fork 69 being at that distance from the fork 60,) the supplemental fork will be actuated, which, through the parts 71, 72, 73, 74, 77, 78, and 67, will operate the main rock-shaft section 61 at the off side of the machine and plant a hill from the box 18 at that side. In the case supposed the check-wire is at the near side of the machine, and in such case the link or rod 78$^a$ may be disconnected or a single link of this character may be employed, connecting the arms 67 77 when the wire is on the near side and shifted to the arms 67$^a$ 77$^a$ when the wire is on the off side. In the latter case the planting devices of the off seedbox will be actuated directly from its main rock-shaft section 61, while those of the near seedbox will be operated through the supplemental rock-shaft 74$^a$. In this mode of planting the seedboxes should be one-eighth nearer together than are the check-buttons 53, and they are made adjustable by sliding the plates 14 on the runner-frame and securing them by pins 80. To accommodate such adjustment, the drill-shafts 38 may be made in two telescoping or adjustable coupled sections or they may be adjusted longitudinally in the bearings 39. In the latter case the cones 40 are also adjusted to keep them in line with the wheels 42. The latter wheels or said cones will be provided with suitable backing-ratchets.

I prefer to mount the checking-forks on joints 81, which are rigid in the direction of movement of the planter, but allow the forks to swing out or down out of line with the check-wire, as shown in dotted lines, Fig. 7. This allows of the ready disengagement of the checking-wire when thrown off and also permits the forks 69 to be thrown down out of line with the check-wire when the simultaneous mode of planting is to be followed. For the convenient casting off of the checking-wire I provide near the guiding devices 54 55 rollers 82, Fig. 5, journaled on levers 83. The latter are pivoted at 84 on a support 85, fixed on the runner-frame, and have their arms 86 connected with cords 87. The latter pass through guides or eyes 88 88 89 and lead to the hand-lifting lever 24. As this lever is drawn back to raise the runners it pulls on the cords 87, raises the rollers 82, and throws the check-wire over the rollers 55, allowing it to fall on the ground. In this throwing off of the check-wire the forks 60 69 coöperate by turning out and down on their joints 81.

It will be observed that the two seeding devices and drill-shafts have in the separate sprocket-wheels 42 42 independent actuating means, so that the machine may be used as a single or double drill and in the former case may employ the seeding devices alternately. When the seeding devices are to be operated simultaneously, as in the ordinary mode of planting, the seedboxes and runners are adjusted on the runner-frame to a distance apart equal to the distance between hills, (and rows,) the main rock-shafts 61 are coupled together by the clamp 62, the supplemental check-forks 69 are turned down, (see dotted lines,) and the supplemental rock-shafts disconnected by the removal of the links or bars 78 78$^a$. The rods 72 72$^a$ may also be removed.

I will now describe a simplified form of my machine especially adapted for the two modes of hilling above referred to.

In Figs. 8 to 12, A A' designate, respectively, the wheel and runner frames of the machine, which frames may be connected together in any suitable and desirable manner. As shown, the wheel-frame A may be formed from a single piece, bent to form the parallel longitudinal sides $a$, in which the axle B is supported. On the axle are mounted the usual covering and supporting wheels 1 1, such wheels being adjustably connected to the axle, so that they can be adjusted toward or from each other to adapt the machine for planting rows at any desired distance apart. The runner-frame A' consists of two parallel transverse bars D, connected at their ends and at intermediate points of their length by longitudinally-extending bars $a'$, which bind the bars D together and project forward beyond the same. On the runner-frame is mounted the seeding mechanism, there being two boxes or hoppers E, supported on the bars D of said frame, and discharge-tubes D' and runners or furrow-openers D² supported from said frame. As shown, the seeding mechanism is adapted to be adjusted laterally of the frame in order to regulate the distances between the rows planted by the machine.

E' designates slides which project forward from the hoppers E and at their inner ends are connected with and adapted to actuate the valve mechanism for regulating the passage of seed from the hoppers. The forward outer end of each of these slides E' is connected, by means of a link $e$, with one end of a lever $f$, pivotally mounted upon a depending pin carried by a plate $f'$, that is adjustably connected to two supporting-bars $q'$ near the forward end of the runner-frame. The other end of such lever $f$ is connected by a link $h$ with the free lower end of an arm $g$, carried by the main operating rock-shaft G or G' of the seeding mechanism. The upper end of the arm $g$ is provided with a sleeve surrounding the main shaft and a set-screw, by means of which it can be rigidly secured to said shaft and moved thereby. As shown, this main shaft is made in two sections G G', adapted, however, to be connected at their inner ends by a coupling-sleeve G², as shown in dotted lines in Fig. 8, and each section of said shaft is provided at its outer end with a depending fork H or H', adapted to be engaged by the balls 53 on the check-row wire 52 as the planter is moved forward. The wire 52 is guided and supported near the forward end of the machine and held in proper position to cause the balls 53 thereon to engage with either the fork H or H' on the shaft-sections G G', respectively, according to the direction in which the planter is moving, by suitable guiding devices at R. With the parts described, the shaft-sections G G' being connected at their inner ends, the seeding mechanisms on both sides of the runner-frame will be simultaneously actuated as each ball 53 on the check-row wire engages with the fork H or H' in the ordinary manner.

The shafts I I' are arranged one in advance of the other and are of such length that each has one end projecting slightly beyond the side of the runner-frame and its inner end extending to a point on the opposite side of the central longitudinal line of said frame. At their inner ends the shafts I I' are provided with upwardly-extending arms N N', respectively, and the arm N of the shaft I is connected by a link O with a corresponding arm G⁴ on the section G of the main rock-shaft, while the arm N' on the shaft I' is connected by a link O' with a corresponding arm G³ on the section G' of the main rock-shaft. The outer ends of the auxiliary shafts I I' are connected to auxiliary check-row forks L L'. These auxiliary forks are carried by sliding blocks M, fitted in guides or slots $s$, formed in side bars S, which are hinged at their forward ends to the side bars of the runner-frame and extend rearwardly therefrom. Each fork L L' is carried at one end of a short rock-shaft, the other end of which is mounted in a suitable bearing in or on the block M, and said shaft is also provided with an upwardly-extending arm L². The upper end of this arm L² is adjustably connected to a rod K, the forward end of which is connected with an arm J' at the outer end of the shaft I or I'. The check-row wire 52 is guided to the auxiliary forks by means of guide-rollers T T', the former being secured to the runner-frame in rear of the forks H H' and the latter being carried by the swinging side bars S of the frame. It will be seen that any movement of either of the auxiliary forks L L' will be transmitted to the seed-slide E' on the opposite side of the machine from that on which the moving fork is situated and that when the parts are in the positions shown in full lines in Fig. 8 every ball 53 on the check-row wire will act to actuate the seeding mechanisms alternately by first engaging with the fork H or H' and then with the fork L or L'. After the rock-shaft is relieved from pressure of the ball 53 it and the parts connected therewith are returned to their normal position by springs P.

When it is desired to have the hills in one row parallel with those in the adjoining rows in the usual manner, the seed-hoopers, runners, and wheels should be spaced apart the distance between each pair of balls 53 on the check-row wire; but when it is desired to have the hills in one row alternate with those in the adjoining rows such parts of the machine can be adjusted so as to be but eighty-seven one-hundredths of the distance between the balls on the check-row wire apart. For planting at both sides of the machine simultaneously the forks L L' are turned out of engagement with the check-wire. As seen in Fig. 7, in the case of the forks 69 this can be done by turning the forks on joints 81.

When it is desired to remove the wheels 1, the rods K are removed and the swinging members S of the runner-frame turned up into the position indicated in dotted lines in Fig. 9.

Referring to Fig. 3, 90 is an adjustable clutch-collar on the drill-shaft, preferably constituting, with the cone 40, a ratchet arrangement to allow backing of the machine without actuation of the drill-shafts. 91 is a a spring and 92 a set collar to hold the cones operatively against the collar 90. The shaft 38 is adjustable in the collars 90 and 92 to allow the shaft to be moved along the frame 11 13 with the seed devices while the cone is kept in line with the wheel 42.

One of the ground-wheels 1 may always be loose on the axle, though adjustable on the axle to be kept in line with its seeding device, and act as a coverer, while the other wheel, similarly adjustable, is adapted to be secured to the axle to drive the latter and the drilling devices, as by a pin in the wheel-hub and a series of transverse holes in the axle.

The shaft 61 is connected with the slide 33 by an arm 93, clamped on the shaft at any convenient point and suitably engaging the plate, as by an eye 94, which incloses the transverse rigid arm 95 of the slide. For drilling when the pitmen 50 are used the arm 93 is set along on the shaft out of engagement with the slide.

The lower ends of the seed-tubes are provided with any preferred and suitable form of seed-valve, with which I have combined mechanism whereby such valve may be operated alternately with the similar valve at the other side of the machine through the rock-shaft mechanism hereinbefore described. For this purpose each section of the rock-shaft 61, Fig. 7ª, is provided with a depending arm 96, adjustable on the shaft to correspond with the adjustment of the seedboxes and adapted to be clamped thereon, as by a bolt 97. The lower end of the arm 96 is connected by links 98 and 99 with a lever-arm 100, fulcrumed at 101 on the tube 16. The lower end or arm 102 of said lever is connected by link 103 with the lower or intermediate cut-off or seed valve. Thus the said lower seed-valve at the near side of the machine, for instance, may be operated not only by the checking-fork 60, but also by the fork 69ª at the off side of the machine through the supplemental rock-shaft 74ª and link 78ª.

On the upper side of the plate 14 are cast or attached studs 104, which serve as guides for the longitudinal movement of the slides 33 and also support the seedbox at such height that while inclosing the seeding-plates 32 the bottoms of said boxes will not rest upon or interfere with the free reciprocation of said slides 33.

What I claim is—

1. In a planter, the combination with two independent seeding mechanisms arranged in the same transverse line, of a sectional rock-shaft, each section being connected with one of the seeding mechanisms and having a check-row fork at its outer end, a coupling for detachably connecting the inner ends of said sections, whereby both seeding mechanisms can be simultaneously operated from either side of the machine, and supplemental check-row forks, one at each side of the machine in line with the aforesaid forks and connected with the seeding mechanism adjacent to the opposite side of the machine, whereby the seeding mechanisms can be alternately actuated from either side of the machine when the inner ends of the sections of the said rock-shaft are disengaged, substantially as set forth.

2. In a planter, the combination with two independent seeding mechanisms arranged in line with each other transversely of the machine, a rock-shaft having two sections, each having a check-row fork at its outer end, means connecting each of said rock-shaft sections with one of the seeding mechanisms, a coupling adapted to connect the inner ends of said sections of shafting to form a rock-shaft extending continuously across the machine and connected with both of the seeding mechanisms, detachable supplemental check-row forks arranged in line with the aforesaid forks, means connecting each of said supplemental forks with one of the sections of the main rock-shaft which extends beyond the opposite side of the machine from the said fork, and means for securing said supplemental forks at either of several points longitudinally of the machine, substantially as set forth.

3. In a planter, the combination with two seeding mechanisms, of a rock-shaft arranged adjacent to and connected with one of said seeding mechanisms, another shaft arranged adjacent to and connected with the other seeding mechanism, each of said shafts having a check-row fork at its outer end and an arm at or near its inner end, two supplemental rock-shafts each having its outer end connected with a check-row fork arranged in line with the fork on one of the main rock-shafts and having its other end extending to or beyond the arm on the other of said main rock-shafts, and a link or rod connecting each of said supplemental rock-shafts with the arm in line therewith, substantially as set forth.

4. In a planter, the combination with two seeding mechanisms, of two rock-shafts each connected with one of said seeding mechanisms and having a check-row fork at its outer end, two supports hinged to and extending longitudinally of the machine, a supplemental check-row fork mounted on each of said hinged supports, in line with the forks on the said rock-shafts, and adapted to be adjusted longitudinally thereof, and connections between each of said supplemental forks and the seeding mechanism adjacent to the opposite side of the machine, substantially as set forth.

5. In a planter, the combination with a wheel-frame, and a runner-frame, of two rock-shafts each connected with one of the seeding mechanisms and provided with a check-row fork, means for actuating either seeding mechanism from the opposite side of the machine from that where it is situated, and means for connecting the inner ends of said rock-shafts, whereby both seeding mechanisms can be simultaneously operated, substantially as set forth.

6. In a planter, the combination with a wheel-frame, and a runner-frame, of two main rock-shafts, each connected with one of the seeding mechanisms and having a check-row fork connected thereto, two independent supplemental rock-shafts, each having its inner end connected to that main rock-shaft which extends in the opposite direction thereto, supplemental check-row forks detachably supported from the runner-frame and situated in line with the forks on the main rock-shafts, links connecting the last said forks with the supplemental shafts, and means for connecting together the main rock-shafts, substantially as set forth.

7. The combination with the main axle, ground-wheels and seeding devices, of guides for the check-wire, longitudinal hinged bars carrying said guides, checking-forks on said bars and means for supporting said bars on the main axle.

8. The combination with the wheel and runner frames having a hinge connection, of longitudinal bars loosely connected with both of said frames and checking-forks and guiding devices on said bars, substantially as set forth.

9. The combination with the wheel and runner frames having a hinge connection, of longitudinal bars hinged at their forward ends to the runner-frame, forward and backwardly movable arms carrying the rear ends of said bars and connected with the wheel-frame, and checking-forks and guiding devices on said bars, substantially as set forth.

10. In a check-row planter, the combination, with a supporting-frame, of two seeding mechanisms mounted one at each side of the frame, checking-forks connected with said mechanisms, and jointed supplemental checking-forks also connected with said seeding mechanisms and movable out of the line of the check-wire, said forks alternately operating said two seeding mechanisms at different times, substantially as set forth.

11. In a check-row planter, the combination, with the seed-tubes, of means for operating the lower seed-valves, consisting of the main rock-shafts, depending arms thereon connected with said valves, the supplemental rock-shafts, checking-forks connected with said main and supplemental shafts, and means for connecting the supplemental shaft at one side of the machine with the main rock-shaft at the other side of the machine, substantially as set forth.

In testimony whereof I affix my signature in presence of two witnesses.

JOHN H. ELWARD.

Witnesses:
J. M. BUSH,
J. H. SCHOOLEY.